United States Patent Office 3,367,200
Patented Feb. 6, 1968

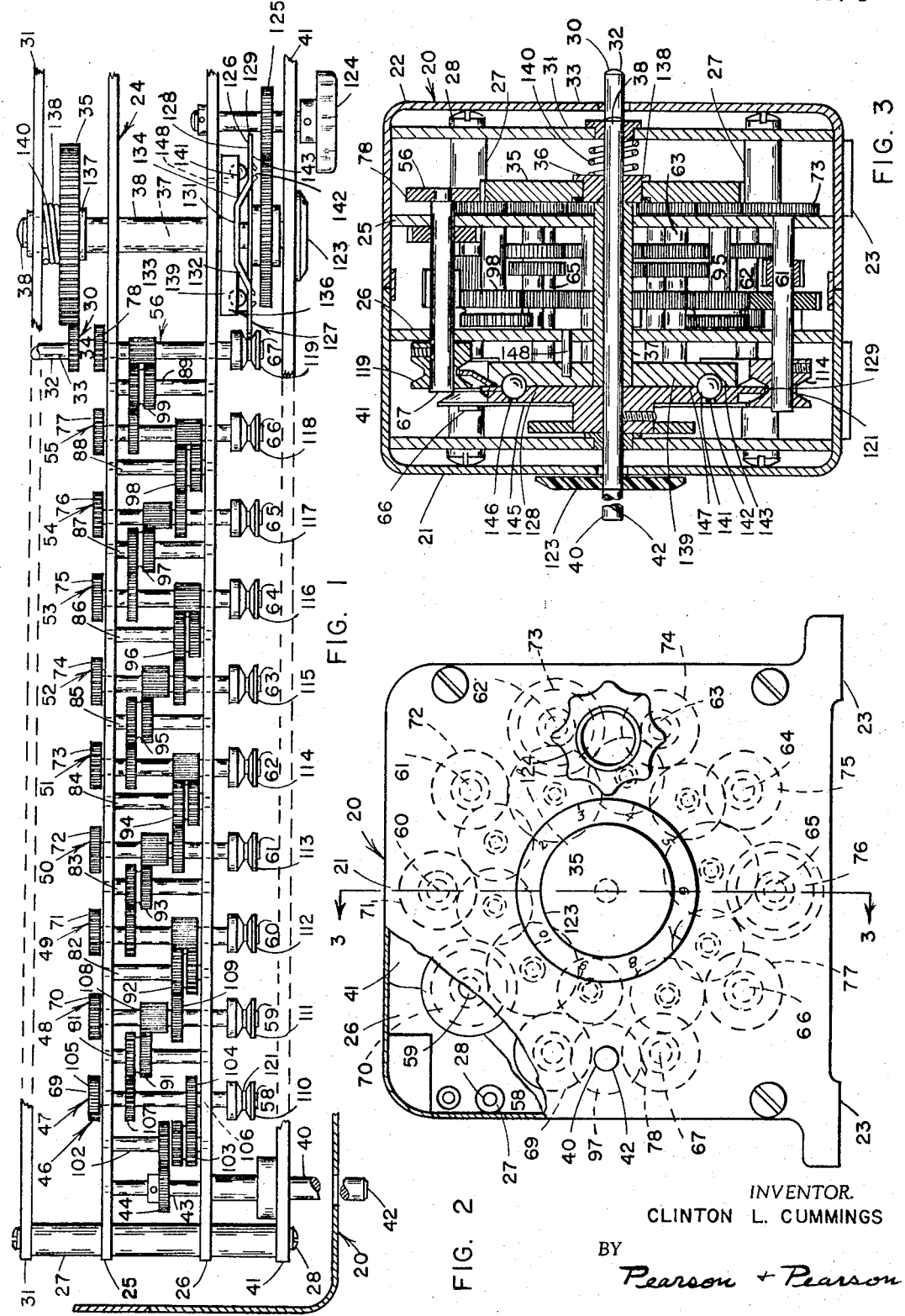

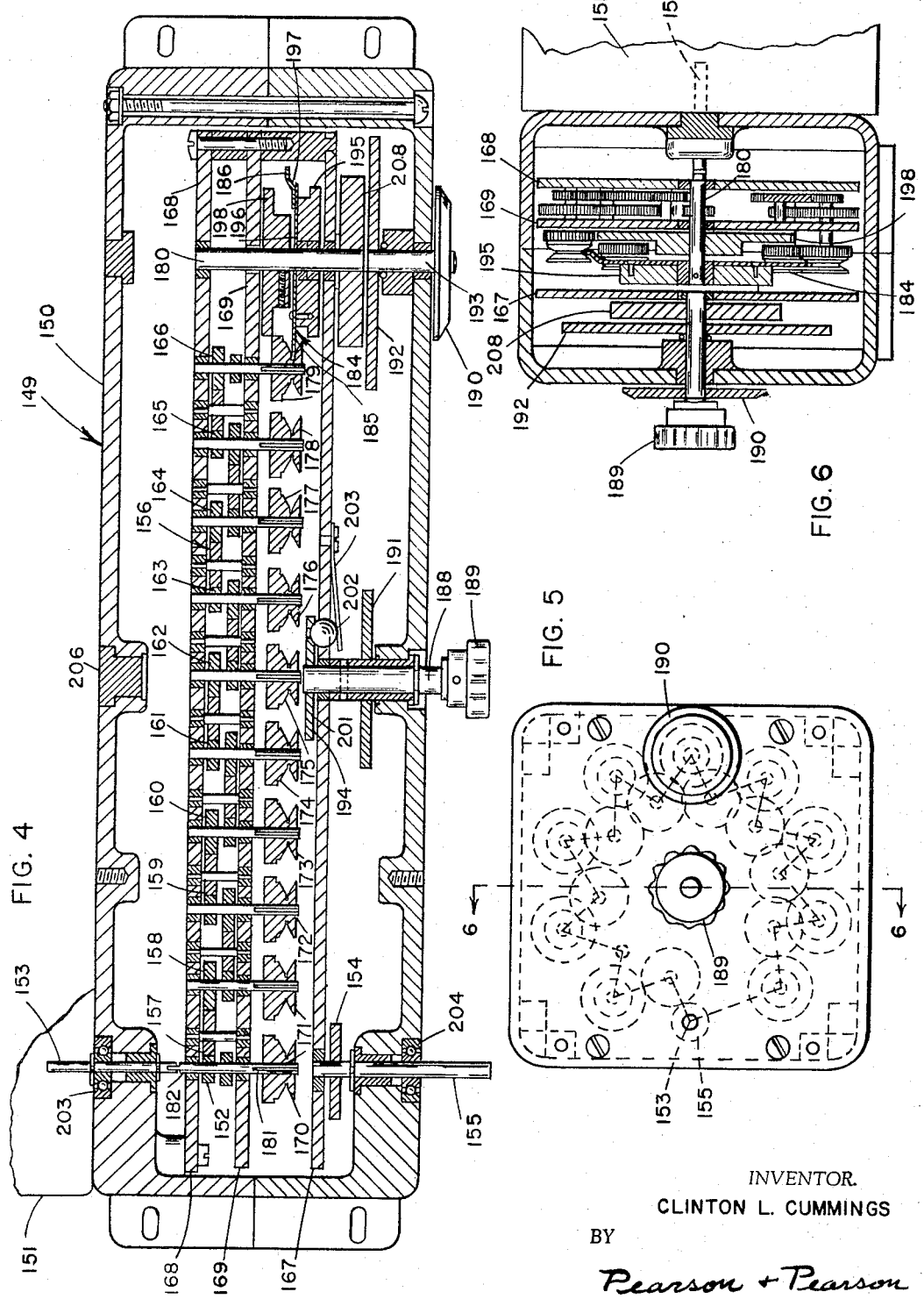

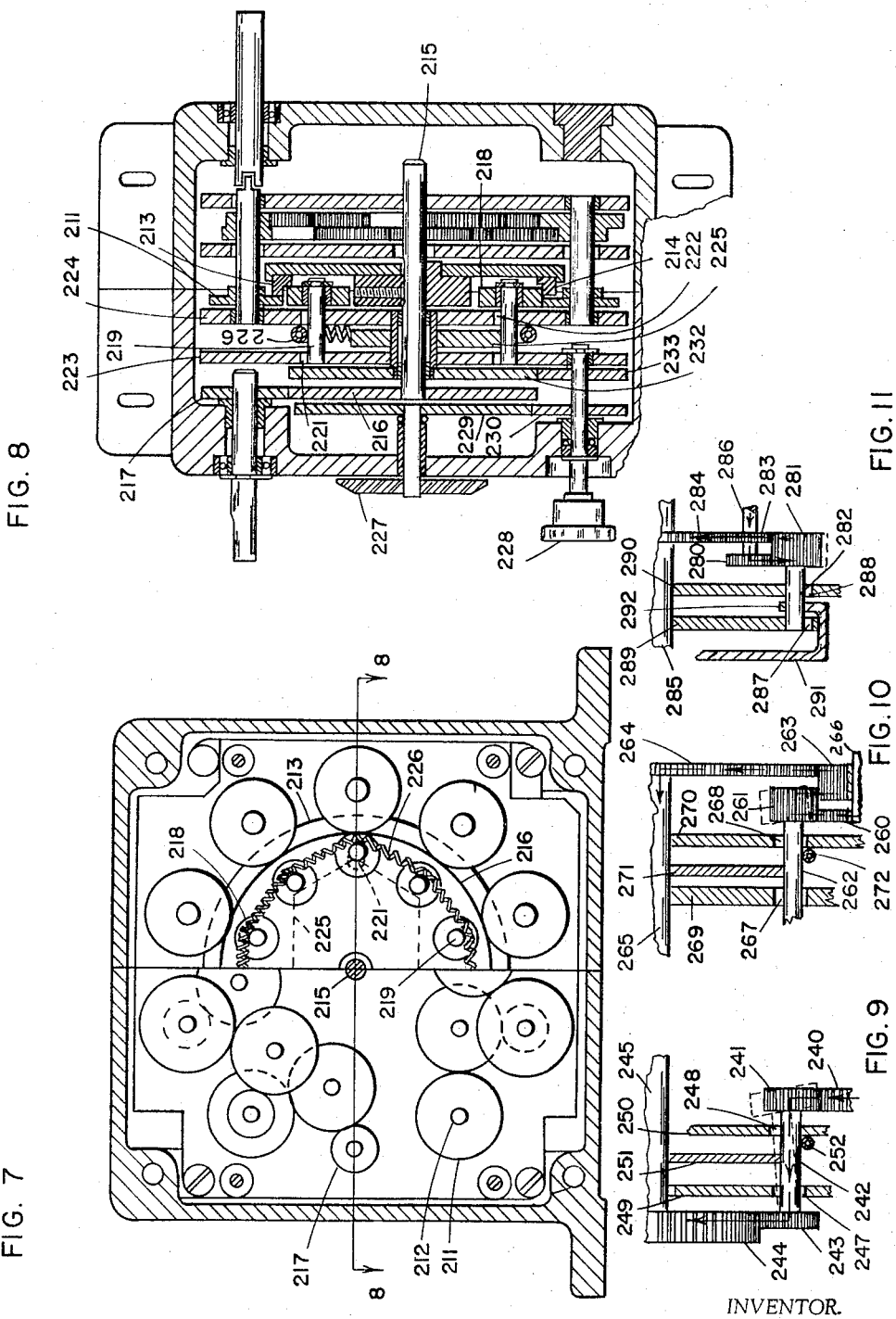

3,367,200
ROTARY SELECTION MECHANISM FOR CHANGING GEAR RATIOS
Clinton L. Cummings, Groton, Mass., assignor to Geartronics Corporation, North Billerica, Mass., a corporation of Massachusetts
Filed May 25, 1965, Ser. No. 458,656
12 Claims. (Cl. 74—329)

ABSTRACT OF THE DISCLOSURE

A speed change device having a main input gear encircled by a plurality of sub-gear trains all connected to an output gear. Each sub-gear train includes a station gear and shaft which produces one of a selected set of gear ratios. No push-pull linear motion is required to change the speed ratio. Ratio is changed by a turning motion which is converted into an axial, linear movement for connecting the appropriate station gear into the train between input and output gears.

---

This invention relates to speed changing units of the type having a main input gear encircled by a plurality of sub-gear trains all connected to an output gear for permitting the selection of one of a number of different output speeds.

In my U.S. Patent 2,642,756 of June 23, 1953, a device of this general type is disclosed wherein the entire gear casing, with its gear train, must be moved outwardly axially for disengagement from an output shaft, then turned to align another sub gear train shaft with the output shaft and then moved axially inwardly into engagement with the output shaft. Certain disadvantages arise with this construction because all of the gears are revolving at all times to create undesirable torque under high speed, high load conditions, because there is a tendency to twist the centre shaft upon which the entire device is hung and because the push-pull linear, axial translation motion required to shift ratios prevents the use of automatic, rotary motion alone as the shifting force.

In the device of this invention, a gear support, or frame, is provided having a large, central gear encircled by the sub-gear trains of a main gear train but the gear support may be fixed in position, attached to a motor to form a multi-ratio gear motor, or otherwise be fixed in position, without requiring a push-pull motion to shift ratios.

The ratio selector shaft of the improved multi ratio, speed change gear unit of this invention requires turning only, with no push-pull linear motion, to change the speed ratio of the unit. The "turn only" feature of the invention is achieved by mounting each station gear of each subgear train for individual axial movement in and out of mesh with the main input, or bull, gear and by mechanically converting the rotary movement of the ratio selector shaft into linear movement of each station gear successively. Each station gear is moved axially by a grooved cam follower, there being a circular disc with a protruding cam face which turns with the selector ratio shaft for moving one station gear at a time into mesh, while, or subsequently, moving an adjacent station gear out of mesh, with the input gear. All of the gears of all of the trains may be continuously revolving, or preferably clutch means is associated with the selector ratio shaft to disengage all gears of the train in rear of the particular station gear in mesh.

The principal object of the invention is to provide a multi-ratio change speed gear unit in which the ratios are changeable by merely turning a selector shaft with no push-pull motion of the shaft or of the gear casing.

Another object of the invention is to provide such a unit with novel cam and follower means arranged to individually advance one follower at a time while retracting an adjacent follower and while holding all of the remaining followers in retracted position in a fixed plane.

A further object of the invention is to provide rotary mechanical means for not only temporarily disengaging the input gear from the station gears, but for also engaging and disengaging successive station gears one at a time with the input gear, thereby reducing torque in the unit.

Still another object of the invention is to provide a low cost, rugged, multi-ratio gear motor requiring only a turn of a thumb wheel, or knob, to shift to any one of a plurality of different gear ratios and speeds.

Other objects and advantages of the invention will be apparent from the claims, the description of the drawings and from the drawings in which:

FIGURE 1 is a sectional view, of the preferred form of the invention, showing the gear train as if extending in a straight line, rather than encircling the output gear in order to facilitate an understanding of the device, the central gear being in shift position.

FIGURE 2 is a front elevation of the preferred form of the invention with parts broken away.

FIGURE 3 is a side elevation of the device shown in FIGURE 2, the central gear being in engaged position.

FIGURE 4 is a view similar to FIGURE 1 of a lower cost embodiment of the invention.

FIGURE 5 is a front elevation of the device of FIGURE 4, mounted on a motor.

FIGURE 6 is a side elevation of the device shown in FIGURE 5.

FIGURE 7 is a view, similar to FIGURES 2 and 5, of another embodiment of the invention.

FIGURE 8 is a view similar to FIGURES 3 and 6 of the said embodiment.

FIGURES 9, 10 and 11 are fragmentary, diagrammatic, side elevations similar to FIGURES 3, 6 and 8 showing other embodiments in which a pinion gear is movable in and out of mesh with the teeth of a station gear.

As shown in FIGURES 1 to 3, the preferred form of the multi-ratio, "turn only" change speed device of the invention includes the gear casing 20, formed by two halves 21 and 22 for convenience of assembly, and having base flanges 23 for fixing the casing in a desired position. Within casing 20 is a gear frame 24 formed of two or more parallel plates 25 and 26 connected together, and to other plates, or to the casing, by spacer sleeves 27, and bolts 28 in a known manner. It is not essential that casing 20 be oil tight since the bearings are preferably self lubricating, or wick lubricated and an occasional drop of oil on the gears keeps the unit in good running condition.

An input shaft 30, is journalled in the rear plate 31 in casing 20, the exposed portion 32 being driven by any suitable source of power, such as an electric motor not shown, and the portion 33 inside casing 20 carrying a small diameter drive gear 34. A centrally disposed main input gear, or bull gear, 35 is rotatable on suitable bearings 36 carried by a sleeve 37 on the shaft 38 at the central axis of frame 24, the main input gear 35 being driven by gear 34 and being of relatively large diameter. An output shaft 40, is journalled in the front plate 41 of casing 20, the exposed portion 42 being capable of driving any suitable apparatus and the portion 43, inside casing 20, carrying the output gear 44.

The multi-ratio gear train 46 of the invention is formed by a plurality of sub gear trains, in the embodiment illustrated there being ten sub gear trains 47, 48, 49, 50, 51, 52, 53, 54, 55 and 56. The sub-gear trains are circumferentially disposed around the main input gear 35 to form spaced ratio stations, each having a ratio station shaft 58, 59, 60, 61, 62, 63, 64, 65, 66 and 67, at a uniform radial distance from the axis of the main input gear, and each having fast thereto a ratio station gear 69, 70, 71, 72, 73, 74, 75, 76, 77 or 78. Gear train 46 includes one less idler shaft than there are station shafts, the idler shafts being designated 81, 82, 83, 84, 85, 86, 87, 88 and 89, each carrying one of the idler gears 91, 92, 93, 94, 95, 96, 97, 98 and 99, and each being axially immovable but rotatable in bearings such as 101 in plates 25 and 26. An additional idler shaft 102 and idler gear 103 connects gear 104 on station shaft 58 to output gear 44 to drive output shaft 40.

Each station shaft is both rotatable and axially slidable in bearings such as 105 and 106 in plates 25 and 26 and carries suitable ratio gears such as 107, 108 and 109 slidably intermeshed with the idler gears such as 91 or 92. Each station shaft also carries one of a plurality of cam followers 110, 111, 112, 113, 114, 115, 116, 117, 118 or 119 whereby the individual, axial translation of each station shaft unit, or assembly, by its follower, moves the station gear in and out of mesh with the main gear 39. It should be noted that when each station shaft unit is in retracted position, its gear such as 108 meshes with the idler gear such as 91, in rear on the train and its gear 109 meshes with the idler gear such as 92 in advance on the train, thereby transmitting rotation from one sub-train rearwardly to the next sub train and finally to the output gear and shaft.

However, when each station shaft such as 59 is axially moved to enmesh its station gear such as 70 with main input gear 35, the ratio gear such as 108 remains enmeshed with the idler gear such as 91 in rear in the train, but the ratio gear, such as 109, is then not enmeshed with the idler gear, such as 92, in advance in the train. Thus the sub-trains in advance of the particular individual station gear being driven by gear 35, are out of mesh and are rotating to increase torque and only the sub trains between the particular station gear and the output gear are rotated to transmit power. It will thus be seen that each sub-gear train, at each ratio station, has translation mechanism consisting of an individual cam follower, station gear shaft and station gear, plus suitable ratio gears fast to the shaft whereby the unit may be axially advanced and retracted relative to the main input gear. Each cam follower such as 110 includes an annular groove 121 of V cross section and the teeth of all of the slidably intermeshing gears of the gear train are chamfered in a well known manner.

The ratio selector shaft 38 is mounted for rotation, without axial translation and extends along the central axis of frame 24, co-axial with the axis of input gear 35, shaft 38 carrying a ratio indicator disc 123 and a turn knob 124. If desired, the turn knob may be at one edge of the gear casing to serve as a thumb turn member, there being a suitable gear connection to the selector shaft.

Rotary mechanical means 126 is provided to convert the rotational motion imparted by turn knob 124 to selector shaft 38 into successive individual linear motions applied to the translation mechanism at each station. As shown, means 126 preferably includes the circular cam means 127 comprising the circular disc 128, rotatable in a fixed plane and fast to shaft 38. The peripheral edge 129 of disc 128 is received in the V grooves 121 of all of the cam followers and includes a face cam portion 131 for advancing one cam follower at a time while retracting the adjacent cam follower. Face cam portion 131 thus has a section 132 inclined toward input gear 35, an intermediate section 133 parallel to gear 35 and a section 134 inclined away from gear 35.

The FIGURE 1 showing is diagrammatic, with all of the followers retracted, because the circular cam means is shown out of contact therewith. However, in the actual device, with the stations encircling the input gear and circular cam, the cam face portion 133 will always be holding one individual cam follower and station gear in advanced position, as shown in FIGURE 3, while the discs holds all of the other cam followers in the plane of the disc so long as the selector shaft 38 is not being turned.

Rotary mechanical disengagement means 136 is preferably provided to disengage the station gears of the sub gear trains, in advance of the particular station gear desired to be enmeshed with the main input gear 35. Disengagement means 136 includes the sleeve 37, which carries the freely rotatable input gear 35 between inner flange 137 and outer flange 138 at one end and is fixed to a plate 139 at the other end, whereby the plate 139, sleeve 37 and gear 35 are axially movable on shaft 38.

A coil spring 140 spring loads the sleeve assembly toward the gear train and the plate 139 includes at least one ball 141 in a ball socket 142 in the outer face 143 and preferably a pair of the same, one on each side of the axis of the shaft as shown. Fast to the selector ratio shaft is a circular plate 145, preferably part of cam disc 128 and having a plurality of corresponding ball sockets such as 146, spaced circumferentially around the inner face 147 thereof, one for each station. Thus as the selector ratio shaft 38 is turned, the sockets 146 act as cams to push the balls and the plate, the sleeve and the input gear away from the gear train and to a position out of mesh with all of the station gears. When the input gear is in full rearward position, the face portion 131 is in position half advancing one station gear and half retracting the adjacent station gear so that these two station gears are both coplanar in a plane different from the then plane of the input gear and out of mesh with each other. The plate 139 is prevented from turning by the pin 148 which slides in a suitable hole in plate 26.

By disengaging all gears in advance of the station gear being used, and by providing the highest speed ratio at the first station, the unit achieves highest speed output with the lowest available inherent torque, the frictional load on the motor of the unused gear train being eliminated.

In operation, assuming station gear 69 is being driven by gear 35, to change from the gear ratio of the sub-gear train of station gear 69 to the next successive ratio of the sub-gear train of station gear 70, the selector ratio shaft 38 is turned to actuate disengagement means 136 and push main input gear 35 out of mesh with station gear 69. Cam face 131 then pulls station shaft 58 back to its non-drive position, thereby disconnecting the remainder of the gear train from the drive, at the same time remeshes gear 107 with its idler gear 91. Cam face 131 then moves station gear shaft 59 and station gear 70 into drive position at the same time moving gear 109 out of mesh with gear 92. Further rotation of shaft 38 reengages the disengagement means 136, the reengagement movement retracting main input gear 35 into mesh with station gear 70. However, the pinion gear 108 is still meshed with the idler gear 91. Since the cam face portion 131 has a wider displacement area than the disengagement means 136, the station gear shaft 59 is still held in the drive position as the disengagement means retracts into mesh and the spring 140 moves the gear 35 into mesh with station gear 70. This completes the ratio change and a similar actuation takes place successively from station to station around the unit. At this point power applied through input shaft 30 goes to gear 35 then to gear 70 then through the pinion 108, to idler 91, then to gear 107 to shaft 58. Since there is a reduction ratio between shafts 59 and 58, the output shaft 40 will run at a speed equal to this ratio. The selector shaft 38 may be turned in either angular direction to any ratio indicated on the indicator disc 123, with the drive connected only from the station selected back to the output shaft. At station 10 all of the gears of the gear train are turning, but imperceptibly because it is the highest ratio, for example 1000 to 1.

The entire frame can be mounted in various quadrants within the casing to secure a variety of locations for the input shaft or the output shaft can be located at any desired angular position around the input gear 35.

In FIGURES 4 to 6 another embodiment of the invention is illustrated, which is less costly to manufacture but does not have the feature of disengagement of the gears in the train not being used.

The speed change device 149, includes the casing 150, which may be mounted on a motor 151 to form a gear motor, the main input gear 152 driven from motor shaft 153, an output gear 154 driving an output shaft 155 and a multi-ratio gear train 156. As in the unit of FIGURES 1 to 3, there are a plurality of sub gear trains 157, 158, 159, 160, 161, 162, 163, 164, 165 and 166, circumferentially disposed at spaced ratio stations around a large central gear 198, each having a ratio station shaft and gear for connecting the main input gear to the output gear at one of the gear ratios.

However, no disengagement means is provided, the gears of the gear train are permanently intermeshed without the provision of slidable station gear shafts and assemblies and the frame plates 167, 168 and 169 are therefore closely spaced to form a relatively thin unit. The ratio station gears are each fast to a cam follower, as at 170, 171, 172, 173, 174, 175, 176, 177, 178 and 179. Each integral station gear and follower unit is axially movable on its non translatable shaft, there being splines 181 on each shaft to permit sliding of the units while retaining a drive connection on the shaft.

The input gear 152 is fast on shaft 182 journalled in plates 168 and 169 and cam means 184, similar to means 127 is fast mounted on shaft 180, to turn in a fixed plane with its peripheral edge 185 received in the grooves of all of the cam followers and with its cam face portion 186 arranged to individually and successively advance and retract one of the follower gear units. The ratio selector shaft 188, may be on the central axis, or may be offset to one edge of the casing to permit a thumb knob 189 to be used. In any case, the shaft 188 either mounts, or turns through gears the indicator disc 190 and either mounts the cam disc 184 or turns the cam disc 184 through gears.

In the developed view of FIGURE 4 the turn knob 189 turns shaft 188 which is connected by gears 191 and 192 to shaft 193 carrying indicator disc 190. Shaft 188 also is connected by gears 194 and 195 to cam disc 184, the latter being carried by bearings 196 on shaft 180.

It will be seen that because all of the gears of the gear train are running at all times, a certain amount of extra wear results and the gear train interposes a load between the input and output shafts. At lower ratios (higher speeds) more torque is required to drive the entire train, this being wasted power and being due to the absence of a disconnect system at the higher speed, lower ratio area of the drive. Ratio selection is achieved at the output, or driven, side of the gear train thus sometimes making it more difficult to shift under low speed, high torque conditions and requiring the motor to be turned off in order to shift. However, the lower cost of the unit compensates for some of the above disadvantages.

The shift cam face 186 is similar to face 131 except that the dwell section 197 is very short to assure that one station gear, or pulley, is completely out of mesh with the central gear 198 before the adjacent station gear is meshed therewith.

Gear 194 has spaced ball recesses 201 and a ball 202, spring loaded at 203 is provided to click into place at each ratio selected on disc 190. Suitable bearings 204 and 205 are provided for shafts 155 and 153, and suitable knock out plugs 206 are provided to enable any one of a plurality of angular relationships between the gear train and the frame.

In operation, input drive shaft 153, drives station gear 170 and through main input gear 152 drives the entire gear train 156. The stations of the gear train encircle the large central gear 198 but the station gears are not connected to gear 198. When one of the station gears such as gear 170 is axially moved into mesh with central gear 198 a 1 to 1 ratio results. When station gear 170 is axially moved out of mesh with central gear 198 and another station gear is axially moved into mesh with gear 198, a different ratio results. The rotation of main input gear 152 is transmitted through the gear train 156 to the particular station gear then meshed with central gear 198 and thence from gear 198 to shaft 180 and gear 208 fast on shaft 180, thence to output gear 154 and output shaft 155.

Cam face 186, when between station gears, has disengaged all station gears from central gear 198, thus accomplishing the disengaging function without a disengagement mechanism per se.

In FIGURE 7 another embodiment of the invention is shown in which the gear train is permanently engaged but the station gears 211 are fast to their shafts 212, rather than slidable on splines. The central gear 213, corresponding to gear 198, is a ring gear with teeth 214 on the inner periphery thereof, and is fast to centre shaft 215. Shaft 215 carries a large gear 216, corresponding to gear 208, which meshes with output gear 217.

A plurality of transfer pinions such as 218, are provided, one for each station gear 211, each pinion 218 being freely rotatable on a shaft 219 slidable in radial slots 221 and 222 in frame pieces 223 or 224. Thus each pinion 218, may move radially into, and out of mesh with its station gear 211 and with the teeth 214 of central ring gear 213. Each pinion 218 is pushed radially outwardly into drive position, one at a time, by the cam 225 and pulled inwardly out of mesh by the coil spring 226 encircling the shafts.

The indicator dial 227 is connected to turn knob 228 by gears 229 and 230 and the cam 225 is rotated by the turn knob 228 through gears 232 and 233.

In operation, all station shafts and station gears are connected and turning at their respective ratios. All of the transfer pinions are held inwardly by spring 226, except the particular pinion 218 held outwardly in its slots by the cam in meshed position, for example the pinion 218 shown at the bottom of the figure. Upon turning knob 228, cam 225 will unmesh one pinion and enmesh the next pinion in either angular direction thereby changing ratio and speed.

This embodiment has the advantage of ease of shifting under load, since it is well known that gears can be unmeshed radially more easily than axially, also the full face of the gear teeth may be used without the chamfering of the other embodiments, such chamfering reducing the effective face width.

In FIGURES 9, 10 and 11 additional embodiments of the invention are shown in which the transfer pinion gear is radially meshed and disengaged from the teeth of a station gear by a cam and return spring.

In FIGURE 9, as shown by the arrows, power input is through each station gear 240, of a permanently meshed gear train, thence through transfer pinion gear 241, pinion gear shaft 242, gear 243 fast on shaft 242, central power take-off gear 244 carried by central shaft 245 and an output gear driven by take-off gear 244. The pinion gear 241, shaft 242 and gear 243 are tiltable in slots 247 and 248 in plates 249 and 250 by cam 251 and retractable to the dotted line disengaged position by coil spring 252.

In FIGURE 10, as shown by arrows, power input is through each station gear 260 of a permanently meshed gear train, thence through transfer pinion 261 carried by pinion gear shaft 262, thence to gear 263 and power take-off central gear 264 carried on central shaft 265, the take-off gear driving the output gear train, not shown. In this embodiment the pinion gear 261 and shaft 262 are radially movable by means of slots 267 and 268 in plates 269 and 270 by cam 271 and retractable to the disengaged position shown in dotted lines, by coil spring 272. Gear 263 is rotatably mounted on the shaft 266 of station gear 260.

In FIGURE 11, as shown by the arrows, power input is through station gear 280 of a permanently meshed gear train, thence through transfer pinion gear 281, carried by pinion gear shaft 282, gear 283, central power take-off gear 284 carried by central shaft 285, and thence to an output gear not shown driven by take-off gear 284. Gear 283 is rotatable on the shaft 286 of station gear 280. The pinion gear 281 and pinion shaft 282 are radially movable in slots 287 and 288 in plates 289 and 290 inwardly by cam 291 to the full line engaged position shown and outwardly to the dotted line disengaged position by the annular leaf spring 292.

I claim:

1. In a rotatable change speed device of the type having a gear casing with a centrally disposed main input gear driven from an input shaft, an output gear driving an output shaft and a multi-ratio gear train, including a plurality of sub gear trains circumferentially disposed at spaced ratio stations around said main gear, each sub-gear train having a ratio station shaft and gear for connecting said main input gear to said output gear at one said gear ratio the combination of a plurality of individual cam followers, each axially movable relative to said casing and associated with one of said ratio station shafts for moving the gear thereon axially in and out of mesh with said main input gear;

a ratio selector shaft, extending along the axis of said main gear, and rotatably mounted in said casing;

circular cam means on said ratio selector shaft and operatively connected to said cam followers, for successively axially advancing one said follower to engage its ratio gear with said main gear while axially retracting the adjacent follower to disengage its ratio gear from said main gear;

whereby rotation of said ratio selector shaft, without axial movement thereof, successively changes the speed ratio between said main gear and said output gear.

2. A rotatable change speed device as specified in claim 1 wherein all of the gears of said gear train, except said station gears, are axially immovable and permanently intermeshed, said main gear is axially immovable;

said station shafts are splined;

and each said station gear is fixed to its follower and axially slidable on the splines of its station shaft into and out of mesh with said main gear;

whereby turning said selector ratio shaft, turns said cam means and individually and successively connects said station gears with said mean gear, to drive all of said permanently intermeshed gears and said output gear.

3. A rotatable change speed device as specified in claim 1 wherein each said follower includes an annular groove of V-shaped cross section, and said cam means comprises a circular disc rotatable in a fixed plane normal to the axes of said station shafts, and having its peripheral edge engaged in all of said grooves, said edge having a face cam portion projecting out of said plane to successively actuate adjacent pairs of said followers while retaining the remaining followers in said fixed plane.

4. A rotatable change speed device as specified in claim 1 wherein each said station gear and cam follower is fast to its station shaft to form a unitary assembly, and each said unitary assembly is axially slidable, relative to said gear casing to move said station gear into, and out of, mesh with said main gear.

5. A rotatable change speed device as specified in claim 1 wherein the station shaft, station gear and cam follower of each said sub gear train is a unitary assembly mounted for axial sliding movement in said gear casing;

said main input gear is mounted in said casing for axial movement, said device includes disengagement means, operably connected to said selector ratio shaft, and temporarily disengaging said main gear from all of said station gears during each successive movement of said circular cam means from station to station, and means for drivingly connecting all of the gears of said gear train between said output gear and the station gear meshed with said main gear and for freeing from said drive connection all gears in advance of the shaft of said station gear thereby reducing torque in said device.

6. A rotatable change speed device as specified in claim 5 wherein said disengagement means includes an element, axially movable, but nonrevolvable in said casing, said element being adapted to axially move said main gear and having at least one socket with a ball therein, in the face thereof;

a circular plate fast to said selector ratio shaft and having a plurality of ball sockets spaced therearound, one for each ratio station, said ball sockets successively receiving said ball as said disc is turned by said shaft;

whereby said disc, ball and element axially move said main gear away from said station gears, while said circular cam means holds two adjacent station gears being moved thereby coplanar with each other.

7. A rotatable change speed device of the type having a plurality of sub gear trains circumferentially disposed around a main input gear, each train having a ratio station gear and shaft for connecting said input gear to an output gear at a different ratio, the combination of:

translation mechanism associated with each said station gear, for moving said gear individually into, and out of, mesh with said main input gear;

a ratio selector shaft, mounted for rotation, without translation, in said device, and mechanical, rotary means on said ratio selector shaft and operably connected to said translation mechanism for successively translating one said station gear into mesh with said input gear while translating the preceding station gear out of mesh with said input gear whereby turning of said ratio selector shaft changes the ratio of said gear drive without requiring an axial translatory force on said shaft.

8. A rotatable speed change device as specified in claim 7 plus:

rotary, mechanical, disengagement means connecting said selector ratio shaft and said main input gear, for disengaging said main gear temporarily from all of said station gears during each actuation of said translation mechanism to disengage from said input gear, all of the said sub-gear trains in advance of the station gear engaged with said input gear.

9. A rotatable speed change device of the type having a plurality of sub-gear trains circumferentially disposed around a large central gear, each sub-gear train having a ratio station gear adapted to be drivingly connected to said central gear;

translation mechanism associated with each said station gear for drivingly connecting each said gear individually with said central gear;

a ratio selector shaft, mounted for rotation, without translation, in said device, and mechanical means on said ratio selector shaft and operably connected to said translation mechanism for individually and successively actuating the same to drivingly connect one said station gear with said central gear and disconnect an adjacent station gear from said central gear;

whereby turning of said ratio selector shaft changes the ratio of said gear drive without requiring an axial translatory force on said shaft.

10. A device as specified in claim 9 wherein:

each said translation mechanism comprises a station gear shaft fast to one of said station gears and axially slidable in said device to mesh and unmesh its station gear with said central gear.

11. A device as specified in claim 9 wherein:

each said translation mechanism comprises a splined station gear shaft rotatable in said device, said station gear being axially slidably on the splines of said shaft to mesh and unmesh with said central gear.

12. A device as specified in claim 9 wherein:

each said translation mechanism comprises a station gear shaft rotatable in said device and positioning its station gear with the teeth thereof alongside the teeth of said central gear;

and a plurality of pinion gears, each mounted in said device for translation from a position meshing with the teeth of a station gear and said central gear for drivingly connecting the same, to a position unmeshed therewith, for disconnecting the same.

References Cited

UNITED STATES PATENTS

| | | | |
|---|---|---|---|
| 1,662,164 | 3/1928 | Pratt | 74—337.5 |
| 2,596,819 | 5/1952 | Murphy | 74—353 |
| 3,232,130 | 2/1966 | Stone | 74—331 |

ROBERT A. O'LEARY, *Primary Examiner.*

DONLEY J. STOCKING, *Examiner.*

H. S. LAYTON, *Assistant Examiner.*